US007585585B2

(12) United States Patent
Ozaki et al.

(10) Patent No.: US 7,585,585 B2
(45) Date of Patent: Sep. 8, 2009

(54) ELECTRODE CATALYST FOR USE IN A FUEL CELLS, AND FUEL CELL AND ELECTRODE UTILIZING SAME

(75) Inventors: Junichi Ozaki, Kiryu (JP); Asao Oya, 5-642-5, Hishi-cho, Kiryu-shi, Gunma (JP); Akira Hamada, Ashikaga (JP); Yoshihiro Ikoma, Oizumi-Machi (JP)

(73) Assignees: Sanyo Electric Co., Ltd., Osaka (JP); Junichi Osaki, Gunma (JP); Asao Oya, Gunma (JP)

( * ) Notice: Subject to any disclaimer, the term of this patent is extended or adjusted under 35 U.S.C. 154(b) by 980 days.

(21) Appl. No.: 10/875,506

(22) Filed: Jun. 25, 2004

(65) Prior Publication Data

US 2005/0037255 A1 Feb. 17, 2005

(30) Foreign Application Priority Data

Jun. 27, 2003 (JP) ............................. 2003-185737

(51) Int. Cl.
*H01M 4/00* (2006.01)
*H01M 8/10* (2006.01)

(52) U.S. Cl. ............................. 429/43; 429/30; 429/40; 429/44

(58) Field of Classification Search .................... 429/33
See application file for complete search history.

(56) References Cited

U.S. PATENT DOCUMENTS 5,488,023 A * 1/1996 Gadkaree et al. ............ 502/182

(Continued)

FOREIGN PATENT DOCUMENTS

EP 1 288 161 A 3/2003

(Continued)

OTHER PUBLICATIONS

Oya, A., et al. "Formation of Mesopores in Phenolic Resin-Derived Carbon Fiber by Catalytic Activation Using Cobalt." Carbon, vol. 33, No. 8, 1995, XP004022484, pp. 1085-1090.

(Continued)

*Primary Examiner*—Patrick Ryan
*Assistant Examiner*—Julian Mercado
(74) *Attorney, Agent, or Firm*—McDermott Will & Emery LLP (57) ABSTRACT

The invention provides a high activity electrode catalyst for fuel cells whose catalytic activity due to an expensive noble metal, such as platinum, has been improved to a higher level through the use of an inexpensive material to enable a reduction in noble metal catalyst usage, a fuel cell in which the above high activity electrode catalyst is used, a membrane-electrode assembly in which the above high activity electrode catalyst is used, and a gas diffusion electrode in which the above high activity electrode catalyst is used. Use is made of an electrode catalyst for fuel cells comprising a carbon material that contain catalytically induced turbostratic structures in parts of its structure and noble metal particles supported thereon, or an electrode catalyst for fuel cells comprising the catalyst mentioned above and a catalyst comprising carbon black and noble metal particles supported thereon as mixed together or an electrode catalyst comprising the catalyst mentioned above and carbon black as mixed together.

13 Claims, 5 Drawing Sheets

U.S. PATENT DOCUMENTS

| | | |
|---|---|---|
| 6,335,122 B1 | 1/2002 | Yamada et al. |
| 6,395,427 B1 | 5/2002 | Sheen et al. |
| 6,939,640 B2 * | 9/2005 | Kourtakis ................... 429/40 |
| 2003/0059666 A1 | 3/2003 | Kourtakis |
| 2003/0175579 A1 | 9/2003 | Uchida et al. |
| 2003/0175580 A1 | 9/2003 | Ozaki et al. |

FOREIGN PATENT DOCUMENTS

| | | |
|---|---|---|
| JP | 57-208073 | 12/1982 |
| JP | 10-284089 A | 1/1998 |
| WO | WO 01/92151 | 12/2001 |
| WO | WO 02/15303 A | 2/2002 |

OTHER PUBLICATIONS

Harris, P.J.F., et al. "A simple technique for the synthesis of filled carbon nanoparticles." Chemical Physics Letters, vol. 293 (1998), XP002327544, pp. 53-58.

Ozaki, Jun-ichi., et al. "H2S decomposition activity of TS carbon derived from furan resin." Carbon, vol. 39, No. 10, Aug. 2001, XP004320018, pp. 1611-1612.

Pasqualini, E. "Nuclear Nanocapsules and Curved Carbon Structures." Carbon vol. 35, No. 6, 1997, XP004073598, pp. 783-789.

* cited by examiner

ELECTRODE CATALYST FOR USE IN A FUEL CELLS, AND FUEL CELL AND ELECTRODE UTILIZING SAME

BACKGROUND OF THE INVENTION

1. Field of the Invention

The present invention relates to an electrode catalyst for use in fuel cells which is improved in the catalytic activity of a noble metal such as platinum by using a carbonaceous material having a particular structure, and to a fuel cell in which such catalyst is used.

2. Description of the Prior Art

In solid polymer type fuel cells, the cell to be inserted in a cell module comprises a sheet-form solid polyelectrolyte membrane, an anode (fuel electrode) and a cathode (oxidizing agent electrode) oppositely disposed in a manner sandwiching the solid polyelectrolyte membrane, as well known in the art.

Figure 9:
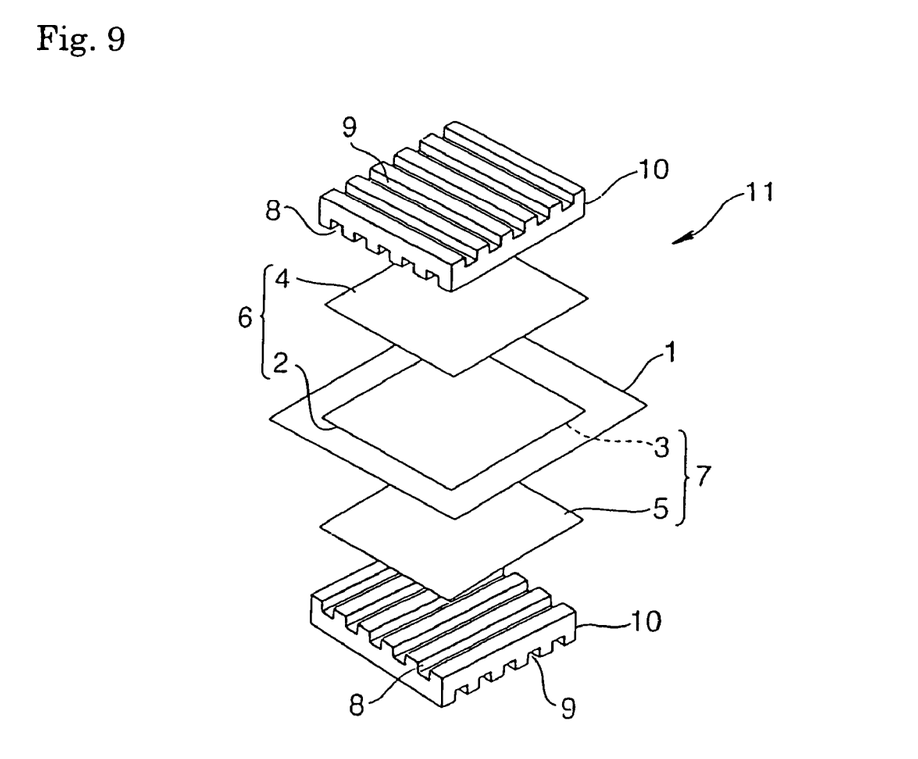
FIG. 9 is an exploded view illustrating the fundamental constitution of a unit cell in a conventional solid polymer type fuel cell.

The fundamental constitution of the unit cell in conventional solid polymer type fuel cells is as shown in the exploded view given in FIG. 9. The unit cell proper (membrane/electrode assembly) is constructed by intimately joining, by means of a hot press, a cathode side catalyst layer 2, and an anode side catalyst layer 3 each comprising carbon black particles and particles of a noble metal (mostly platinum (Pt) or a platinum group metal (Ru, Rh, Pd, Os, Ir)) supported thereon respectively to both the main faces of a sheet-like solid polyelectrolyte membrane 1. Oppositely to the catalyst layer 2 and catalyst layer 3, respectively, there are disposed a cathode side gas diffusion layer 4 and an anode side gas diffusion layer 5 each structurally comprising a carbon paper, a woven carbon cloth or a like material coated with a mixture of carbon black and polytetrafluoroethylene (PTFE). Thereby constituted are a cathode 6 and an anode 7, respectively.

These gas diffusion layers 4 and 5 serve to feed and discharge an oxidizing agent gas (e.g. air) and a fuel gas, such as natural gas, city gas, methanol, LPG or butane, respectively, and at the same time function as electric current collectors for feeding electricity to the outside. The unit cell proper is sandwiched between a pair of separators 10 made of a conductive and gas-impermeable material and equipped with gas channels 8 facing to the unit cell proper and cooling water channels 9 on the opposite main faces. A unit cell 11 is thus constituted.

Employed as the solid polyelectrolyte membrane 1 are sulfonic acid group-containing polystyrenic cation exchange membranes used as cationic conductive membranes, and fluorine-containing ion exchange resin membranes, typically membranes made of a mixture of a fluorocarbonsulfonic acid and polyvinylidene fluoride, membranes produced by grafting trifluoroethylene onto a fluorocarbon matrix, and perfluorosulfonic acid resin membranes (e.g. Nafion™ membranes, products of DuPont). These solid polyelectrolyte membranes 1 contain proton exchange groups in each molecule and, when the water content arrives at a saturation level, the specific resistance at ordinary temperature becomes 20 Ωcm or below and they thus function as proton conductive electrolytes.

When reactant gases are fed to the above electrodes 6 and 7, respectively, three-phase interfaces involving a gaseous phase (reactant gas), a liquid phase (solid polyelectrolyte membrane) and a solid phase (catalyst supported on each electrode) are formed at the boundaries between the platinum group noble metal-supporting catalyst layers 2, 3 and the solid polyelectrolyte membrane 1, and allow electrochemical reactions to proceed, which lead to direct current electric power generation.

The electrochemical reactions include the following:
On the anode side: $H_2 \rightarrow 2H^+ + 2e^-$
On the cathode side: $1/2 O_2 + 2H^+ + 2e^- \rightarrow H_2O$ The $H^+$ ions formed on the anode (7) side migrate to the cathode (6) side through the solid polyelectrolyte membrane 1, while electrons ($e^-$) migrate to the cathode (6) side through an external load.

On the other hand, on the cathode (6) side, oxygen contained in the oxidizing agent gas reacts with the $H^+$ ions and electrons ($e^-$) coming from the anode (7) side to form water. Thus, the solid polyelectrolyte type fuel cell generates direct electric current from hydrogen and oxygen while forming water.

In the above-described conventional solid polymer type fuel cell, such an expensive catalyst as platinum or a platinum-based alloy catalyst (e.g. Pt—Fe, Pt—Cr, Pt—Ru) is used in the electrodes in a relatively large amount, for example about 1 mg/cm² per cell and, therefore, the electrode catalyst cost forms a large proportion of the cell module cost. Therefore, to reduce the usage of the noble metal catalyst is now one of the important tasks in putting fuel cells to practical use.

Various methods of achieving reductions in noble metal catalyst usage have been investigated to fulfill such task. One of them thus proposed comprises forming electrodes using a high density dispersion of noble metal catalyst particles with several nanometers (nm) in size on carbon black having a large specific surface area. However, this method still has problems in that there arises a problem of catalytic activity lowering due to catalyst sintering or elution and in that about 0.5 to 1 mg/cm² of a noble metal catalyst is still required, hence the high cost problem is not solved as yet.

The use, as a platinum substitute catalyst, of an organometallic compound having a chelate structure or a metal oxide having a pyrochlore-type structure has also been investigated (cf. Japanese Kokai Publication Sho. 57-208073 or U.S. patent application Publication No. 2003-175580). In the actual circumstances, however, these substitutes are low in catalytic activity as compared with platinum catalysts.

The present inventors previously found that a phase having a graphite-like structure that has developed like an onion-like laminate around each metal particle (e.g. iron particle) having a size of the order of nanometers which structure is obtained by carbonizing a material capable forming hardly graphitizable carbon with an iron group metal compound, such as ferrocene, added thereto (hereinafter such phase is referred to as "carbon nanoonion phase") and proposed that a carbonaceous material having such carbon nanoonion phase be used as an electrode catalyst for fuel cells (cf. Japanese Patent Application 2002-050381 or Japanese Kokai Publication 2003-249231).

However, those electrode catalysts for fuel cells in which the above-mentioned carbonaceous material is used have a problem in that their catalytic activity is low as compared with the conventional electrode catalysts comprising a noble metal catalyst supported on carbon black, hence the desired reduction in noble metal catalyst usage cannot be attained.

Accordingly, it is an object of the present invention to provide a higher activity electrode catalyst for fuel cells by improving the catalyst activity of an expensive noble metal catalyst, such as a platinum catalyst, using a less expensive material while reducing the usage of the noble metal catalyst.

Another object of the invention is to provide a fuel cell in which such high activity electrode catalyst is used.

A third object of the invention is to provide a membrane-electrode assembly resulting from lamination of one or two catalyst layers in which the above high activity electrode catalyst is used with a solid polyelectrolyte membrane.

A fourth object of the invention is to provide a gas diffusion electrode resulting from lamination of a catalyst layer in which the above high activity electrode catalyst is used with a gas diffusion layer.

SUMMARY OF THE INVENTION

As a result of intensive investigations made by the present inventors to accomplish the above objects, it was found that when a noble metal catalyst, such as a platinum catalyst, is supported on a carbonaceous material having the above-mentioned carbon nanoonion phase, the catalytic activity of the noble metal, such as platinum, is increased by the synergy between both the constituents, hence the above objects can be accomplished. This and other findings have now led to completion of the present invention.

For achieving the above objects, the present invention provides an electrode catalyst for fuel cells which comprises a carbon material that contain catalytically induced turbostratic structures in parts of its structure and noble metal particles supported thereon.

In the electrode catalyst for fuel cells according to the invention, noble metal particles are supported on a carbonaceous material having turbostratic structures in parts of its structure, so that the oxygen-reduction capacity manifested by the turbostratic structures activates the noble metal catalyst, with the result that the electrode catalyst can have a higher level of activity owing to the synergy between both the constituents. The noble metal catalyst usage can be reduced accordingly.

In another aspect, the invention provides an electrode catalyst for fuel cells which comprises a catalyst comprising a carbon material that contain catalytically induced turbostratic structures in parts of its structure and noble metal particles supported thereon and a catalyst comprising carbon black and noble metal particles supported thereon as mixed together.

The electrode catalyst for fuel cells according to this aspect of the invention is constituted of the catalyst and a conventional catalyst comprising carbon black and noble metal particles supported thereon as mixed together. Since carbon black is capable of retaining water, the catalyst layer is improved in water drainage and in reactant gas diffusion as well and, furthermore, the solid polyelectrolyte and the solid polyelectrolyte membrane are wetted and, as a result, are improved in ionic conductivity. A catalyst layer higher in activity and durability can thus be provided.

In a third aspect, the invention provides an electrode catalyst for fuel cells which comprises a carbon material that contain catalytically induced turbostratic structures in parts of its structure and noble metal particles supported thereon and carbon black as mixed together.

The electrode catalyst for fuel cells according to this aspect of the invention is constituted of the catalyst and carbon black as mixed together. Since carbon black is capable of retaining water, improvements are produced in water drainage and in reactant gas diffusion, so that the solid polyelectrolyte membrane is improved in wettability and ionic conductivity. A catalyst layer high in activity and water drainage can thus be provided.

In an embodiment of the invention, the noble metal particles in the electrode catalyst for fuel cells are selected from among platinum particles and other platinum group metal particles.

Platinum and other platinum group metals can provide high levels of activity and are readily available, and high power generation characteristics can be obtained accordingly.

In an embodiment of the invention, the turbostratic structures in the electrode catalyst for fuel cells created by admixing a metal compound with a hardly graphitizable carbon-forming material, followed by carbonization by heat treatment.

Since the turbostratic structures mentioned above are obtained by admixing of a metal compound with a hardly graphitizable carbon-forming material, followed by carbonization by heat treatment, a carbonaceous material having such turbostratic structures in parts of its structure can be produced with ease. A carbonaceous material having the desired catalytic function (oxygen reduction ability) can be obtained by controlling the process of carbonization through selection of such conditions as the raw material species, reaction atmosphere, and treatment temperature.

In an embodiment of the invention, the turbostratic structures in the electrode catalyst for fuel cells comprise carbon nanoonion structures (onion-like carbon nanostructures) that have developed each in the form of an onion-like laminate around a metal particle.

When the turbostratic structures comprise carbon nanoonion structures that have developed each in the form of an onion-like laminate around a metal particle, a catalyst having better performance characteristics can be obtained.

In an embodiment of the invention, the hardly graphitizable carbon-forming material to be used in producing the electrode catalyst for fuel cells is selected from the group of materials consisting of polyfurfuryl alcohol, furan resins, thermosetting resins, inclusive of phenol resins, brown coal, cellulose, polyvinylidene chloride and lignin.

By selecting the material from the above group, it becomes possible to achieve reductions in cost.

In an embodiment of the invention, the metal compound to be used in producing the electrode catalyst for fuel cells contains at least one of iron, cobalt, nickel, chromium and manganese.

Iron, cobalt, nickel, chromium and manganese are readily available and inexpensive and, when a metal suited for the production conditions is selected from among them, those carbon nanoonion structures which have developed each in the form of an onion-like laminate around a particle of the metal species selected can be obtained with ease. A better catalyst high in activity can be obtained accordingly.

In an embodiment of the invention, the level of addition of the metal compound to the hardly graphitizable carbon-forming material to be used in producing the electrode catalyst for fuel cells is within the range of 0.5 to 15% by mass based on the metal component contained in the metal compound.

When the addition level is within the above range, those carbon nanoonion structures which have developed each in the form of an onion-like laminate around a metal particle can be obtained with ease, hence a better catalyst high in activity can be obtained and, furthermore, an electrode catalyst having a desired catalytic activity can be produced by varying the metal compound addition level within the above range.

At addition levels exceeding the upper limit of the above range, the metal compound may remain undissolved in the hardly graphitizable carbon-forming material (e.g. a polymer) and/or, even if the metal compound is dissolved, for example in the case of brown coal, graphitization may possibly proceed and result in an increased proportion of the graphite structure. When, conversely, the addition level is below the lower limit of the above range, those carbon nanoonion structures which have developed each in the form of an onion-like laminate around a metal particle may not be obtained.

In an embodiment of the invention, the metal compound to be used in producing the electrode catalyst for fuel cells is in the form of a nitrate, chloride, acetate or acetylacetonato complex, or a metallocene or a derivative thereof.

These metal compounds are readily available, and a metal compound adapted to the production conditions and favorable from the cost viewpoint can be selected from among those metal compounds.

In a further aspect, the invention provides a fuel cell in which the electrode catalyst for fuel cells according to any of Claims 1 to 3 is used.

A high output, low cost cell module can thus be provided.

In a further aspect, the invention provides a fuel cell in which one or both of the catalyst layers is/are formed from a mixture of the electrode catalyst for fuel cells according to any of Claims 1 to 3 and a solid polyelectrolyte.

By employing such catalyst layers with a structure having the solid polyelectrolyte network expanded in the direction of thickness of the catalyst layer as well, it becomes possible to markedly increase the number of three phase interfaces functioning as reaction sites and attain a high level of electrode activity as compared with a fuel cell in which a catalyst layer is disposed merely on each side of the solid polyelectrolyte membrane.

In an embodiment of the invention, a catalyst layer comprising a mixture of the electrode catalyst for fuel cells according to any of Claims 1 to 3 and a solid polyelectrolyte is applied on the a cathode side in the fuel cell.

A higher level of oxygen reducing capacity can thus be manifested on the cathode side, resulting in an improvement in power generation performance.

In a further aspect, the invention provides a membrane-electrode assembly comprising a catalyst layer formed, in the form of a layer on at least one side of a solid polyelectrolyte membrane, from the electrode catalyst for fuel cells according to any of Claims 1 to 3 or a mixture thereof with a solid polyelectrolyte.

The membrane-electrode assembly of the invention is simple in constitution and easy to handle and can be used in the manufacture of a high output, low cost cell module.

In a still further aspect, the invention provides a gas diffusion electrode which comprises a catalyst layer formed, on a gas diffusion layer, from the electrode catalyst for fuel cells according to any of Claims 1 to 3 or a mixture thereof with a solid polyelectrolyte.

The gas diffusion electrode of the invention is simple in constitution and easy to handle and can be used in the manufacture of a high output, low cost cell module.

DETAILED DESCRIPTION OF PREFERRED EMBODIMENTS

In the following, typical modes of embodiments of the invention are described in detail referring to the accompanying drawings.

[Preparation of a carbon material that contain catalytically induced turbostratic structures in parts of its structure (hereinafter such material is sometimes referred to as "carbon nanoonion material")]

A carbon nanoonion material was prepared by adding iron acetylacetonato complex to a furan resin obtained from Hitachi Kasei at an addition level of 3% by mass on the iron basis, heating the mixture to 1,000° C. at a rate of 10° C./min in a nitrogen stream and maintaining the mixture at 1,000° C. for 1 hour.

Figure 1:
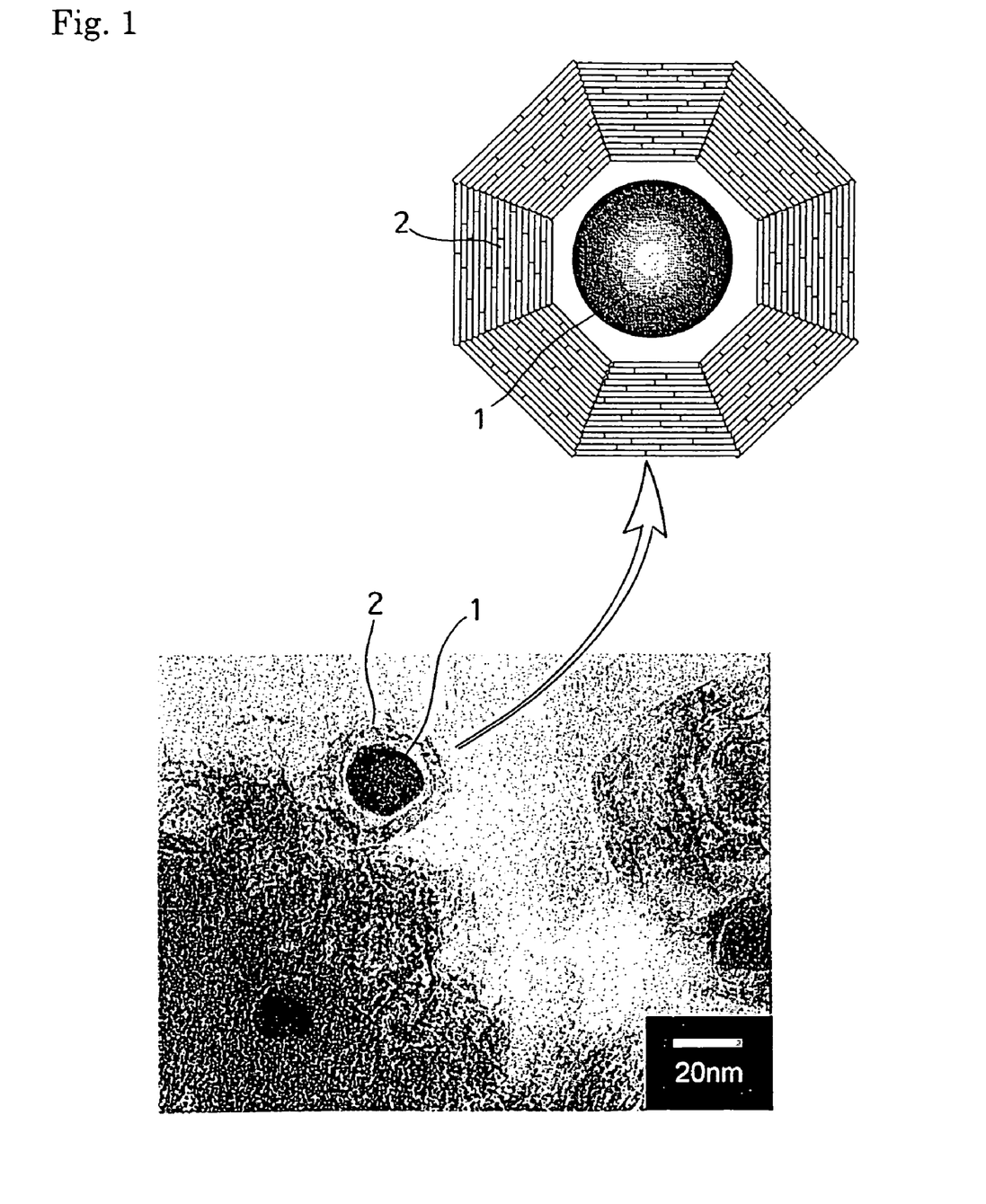
FIG. 1 is the TEM photograph of a part of the carbon nanoonion material as observed for the state of carbonization under a transmission electron microscope, together with a schematic magnification of a part thereof.

FIG. 1 is the TEM photograph of a part of the carbon nanoonion material as observed for the state of carbonization under a transmission electron microscope. The formation of turbostratics 2 in a graphite-like structure as developed each in the form of an onion-like laminate around a minute iron particle 1 of the nano (nm) order in size could be confirmed. Such turbostratic structures amounted to about 60% of the whole. The remaining proportion is estimated to be composed of an amorphous structure with a slight proportion of a graphitized structure.

Figure 2:
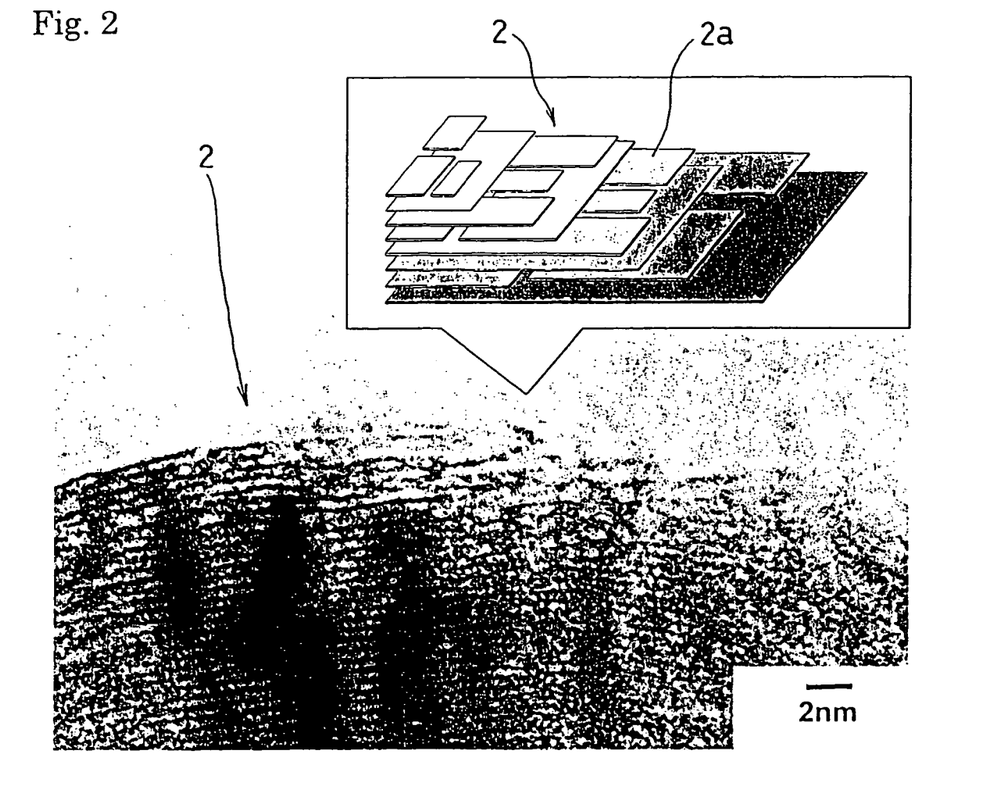
FIG. 2 is an enlarged TEM photograph of a part of a turbostratic structure of the carbon nanoonion material shown in FIG. 1, together with a schematic magnification of a part thereof.

FIG. 2 is an enlarged TEM photograph of a part of a turbostratic structure 2 and, as shown in the schematic representation of a part thereof, a plurality of graphenes 2a exist in parallel on the same plane and a plurality of such graphenes form an onion like laminate structure. Each graphenes 2a has a form resulting from two-dimensional interconnection of hexagonally bound carbon atoms. Such turbostratic structure 2 has no three-dimensional (in the direction of lamination) regularity and, in this respect, is distinctly different from the graphitized structure. The spacing in the direction of lamination was 3.40 Å, hence narrower than that of PFA (3.9 Å) or that of pitch coke PC (3.45 Å) but rather close to the value of electrode graphite GE (3.38 Å).

Figure 3:
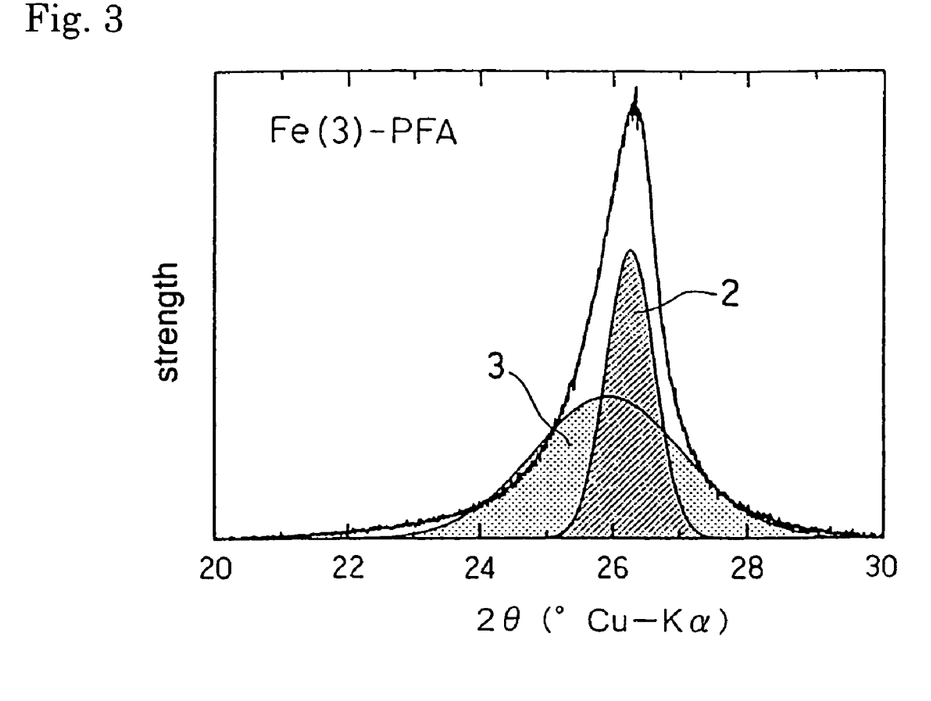
FIG. 3 shows the X ray diffraction (XRD) pattern of the carbon nanoonion material shown in FIG. 1 as recorded by using the Cu-$K\alpha$ line.

FIG. 3 shows the X ray diffraction (XRD) pattern of the carbon nanoonion material as recorded by using the Cu-$K\alpha$ line. The measurement conditions were as follows: apparatus: Rigaku Denki model RINT2100V/PC powder X ray diffractometer; X-ray source: Cu-$K\alpha$; voltage: 32 kV, current: 20 mA; scanning speed: 0.2°/min; sampling width: 0.010°.

In FIG. 3, the shaded region presumably corresponds to the turbostratic 2 structure and the dotted region to the amorphous 3 structure. It is thus presumable that the carbon nanoonion material prepared in this example mostly has turbostratic structures without advanced graphitization and partly contains graphitized portions in its structure.

In the practice of the invention, catalyst layers can be formed, for example, by pressing the electrode catalyst of the invention into thin layers on the surfaces of a solid polyelectrolyte membrane.

In the practice of the invention, it is also possible to form a catalyst layer by shaping a mixture of the electrode catalyst for fuel cells according to the invention and a solid polyelectrolyte into a thin layer. When this constitution is employed, the network of the solid polyelectrolyte is developed in the direction of thickness of the catalyst layer as well, so that the number of three phase interfaces functioning as reaction sites can be markedly increased and, accordingly, a high level of electrode activity can be obtained. This catalyst layer is preferably applied on the cathode side of the fuel cell; a higher level of oxygen reducing capacity manifests itself on the cathode side, and the power generation performance can be improved.

Figure 4:
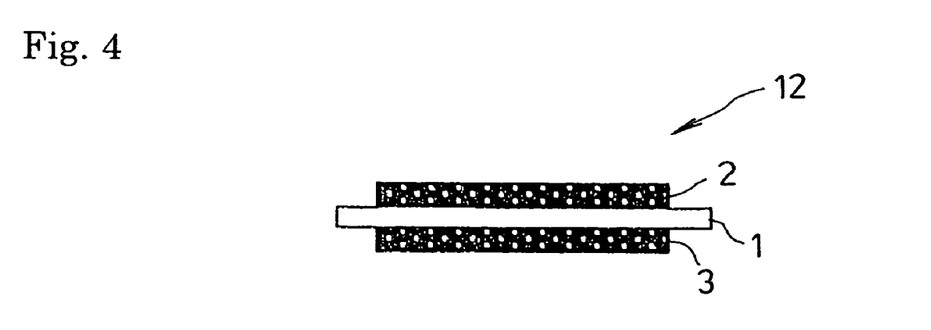
FIG. 4 is an explanatory sectional view of an embodiment of the membrane-electrode assembly of the invention.

FIG. 4 is an explanatory sectional view of an embodiment of the membrane-electrode assembly of the invention.

In the membrane-electrode assembly 12 of the invention as shown in FIG. 4, catalyst layers 2 and 3 are formed, each in the form of a layer, from the electrode catalyst for fuel cells according to the invention or a mixture thereof with a further added solid polyelectrolyte on the surfaces of a solid polyelectrolyte membrane 1.

The membrane-electrode assembly 12 of the invention is simple in constitution and easy to handle, and a unit cell of a solid polymer type fuel cell can be manufactured with ease using the membrane-electrode assembly 12. Thus, a high output, low cost cell module can be produced.

Figure 5:
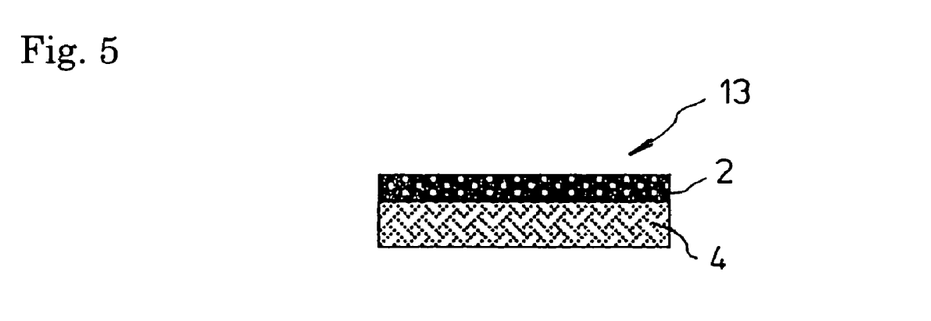
FIG. 5 is an explanatory sectional view of an embodiment of the gas diffusion electrode of the invention.

FIG. 5 is an explanatory sectional view of an embodiment of the gas diffusion electrode of the invention.

In the gas diffusion electrode 13 of the invention as shown in FIG. 5, a catalyst layer 2 (or catalyst layer 3) formed from the electrode catalyst for fuel cells according to the invention or a mixture thereof with a further added solid polyelectrolyte is disposed on a gas diffusion layer 4 (or gas diffusion layer 5).

The gas diffusion electrode 13 of the invention is simple in constitution and easy to handle, and a unit cell of a solid polymer type fuel cell can be manufactured with ease using the gas diffusion electrode 13. Thus, a high output, low cost cell module can be produced.

The carbon black to be used in the practice of the invention is a spherical or chain-like carbon species in a fine powder form as produced by gaseous phase cracking or incomplete combustion of a natural gas or hydrocarbon gas and includes, among others, channel black, furnace black, thermal black, lamp black, acetylene black, and Ketjen black, so called according to the production method and differing in particle size, oxygen content, volatile components, specific surface area, fine structure and so forth. In the practice of the invention, all such carbon black species can be used and mixtures of two or more of these may also be used. Commercial products are also employable. Activated carbon may also be used as a carbonaceous material having a similar structure.

EXAMPLES

The following working examples and comparative examples illustrate the present invention in further detail. These examples are, however, by no means limitative of the scope of the invention.

Example 1

(Preparation of an electrode catalyst for fuel cells according to the invention)

An electrode catalyst for fuel cells according to the invention was prepared by causing platinum to be supported on the above-mentioned carbon nanoonion material in the following manner.

A solution (solution 1) was prepared by adding 100 cc of distilled water and 1,068 cc of $H_2O_2$ (30% by mass) to 265.5 mg of chloroplatinic acid hexahydrate and stirring the resulting mixture for 10 minutes using a magnetic stirrer.

Separately, a solution (solution 2) was prepared by dissolving 0.957 g of the reducing agent $Na_2S_2O_4$ in 17.55 cc of distilled water.

The whole amount of solution 2 was added dropwise over 70 minutes to solution 1 maintained at 50° C. on an oil bath, and the resulting mixture was stirred for 30 minutes using a magnetic stirrer. The volume of the resulting solution was measured, and the platinum concentration was calculated. 100 mg of the carbonaceous sample (the above-mentioned carbon nanoonion material) was weighed and dispersed in 200 cc of distilled water using ultrasonic waves to give a slurry composition. This slurry was warmed to 50° C. on a water bath, and an amount corresponding to the amount to be supported of a platinum colloid was added dropwise to the slurry over 30 minutes, followed by overnight stirring. The resulting slurry was filtered through a membrane filter with a pore size of 1 μm, followed by continuous washing with distilled water until the pH amounted to 6 or higher. Thereafter, the solid was transferred to a vacuum drier heated to 120° C. and dried overnight to give a platinum-supporting carbonaceous material (an electrode catalyst for fuel cells according to the invention).

Comparative Example 1

(Preparation of a comparative electrode catalyst for fuel cells)

A comparative electrode catalyst for fuel cells was prepared in the same manner as in the preparation of the above-mentioned electrode catalyst for fuel cells according to the invention except that Ketjen black EC was used as the carbonaceous material.

(Catalytic activity evaluation)

Test electrodes were prepared in the following manner and subjected to catalytic activity evaluation.

A Nafion solution (50 μl) was added to 5 mg of each catalyst powder obtained, and the mixture was subjected to ultrasonication for 20 minutes. Then, 150 μl of water and 150 μl of ethanol were added, followed again by 20 minutes of ultrasonication, to give an ink with the catalyst uniformly dispersed therein.

1 to 2 μl of this ink was dropped on a glassy carbon-made rotating electrode with a diameter of 3 mm and then dried.

After 20 minutes of bubbling of a 1 M aqueous solution of sulfuric acid with oxygen gas, the rotating electrode was immersed in the electrolysis solution, and the rest potential was measured. This potential was applied to the electrode for 1,000 seconds and then the rest potential was again measured, and the electrode was rotated at 1,500 rpm. The electrode potential was varied from the rest potential to −0.1 V vs Ag/AgCl at a sweep rate of 0.5 mV/sec, and the changes in current were recorded as a voltammogram.

Figure 6:
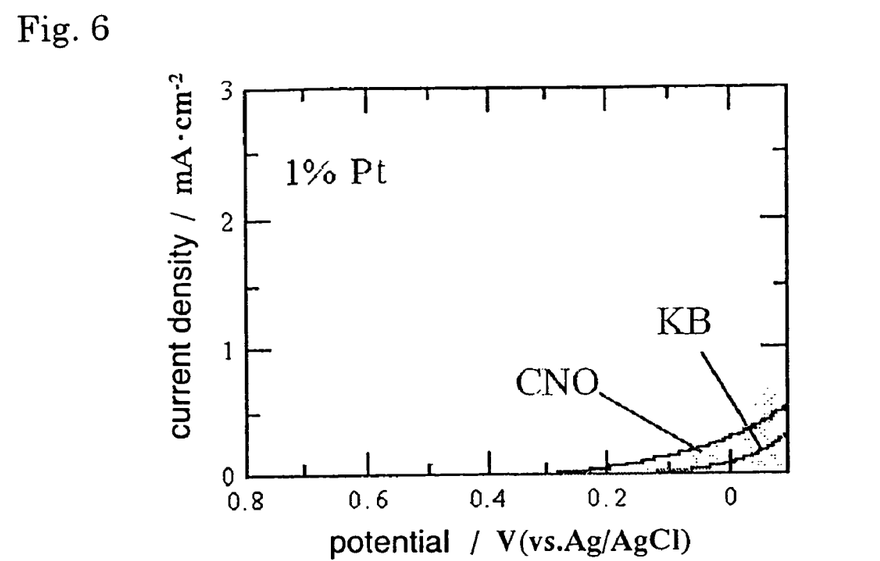
FIG. 6 shows the oxygen reduction voltammogram of an electrode catalyst for fuel cells according to the invention as comprising 1% by mass of platinum supported on a carbon nanoonion material (CNO) and that of a comparative electrode catalyst for fuel cells as comprising 1% by mass of platinum supported on Ketjen black EC (KB).
Figure 7:
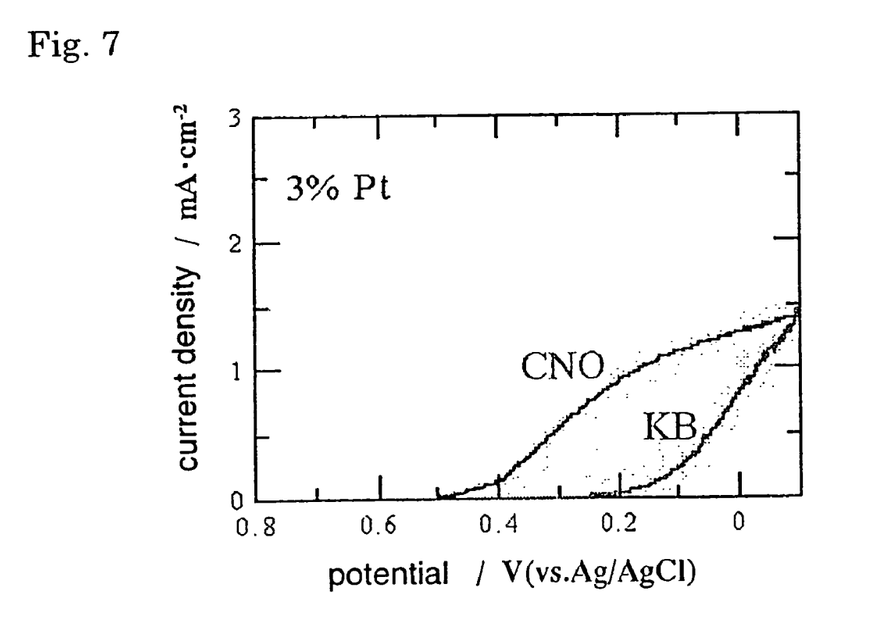
FIG. 7 shows the oxygen reduction voltammogram of an electrode catalyst for fuel cells according to the invention as comprising 3% by mass of platinum supported on a carbon nanoonion material (CNO) and that of a comparative electrode catalyst for fuel cells as comprising 3% by mass of platinum supported on Ketjen black EC (KB).
Figure 8:
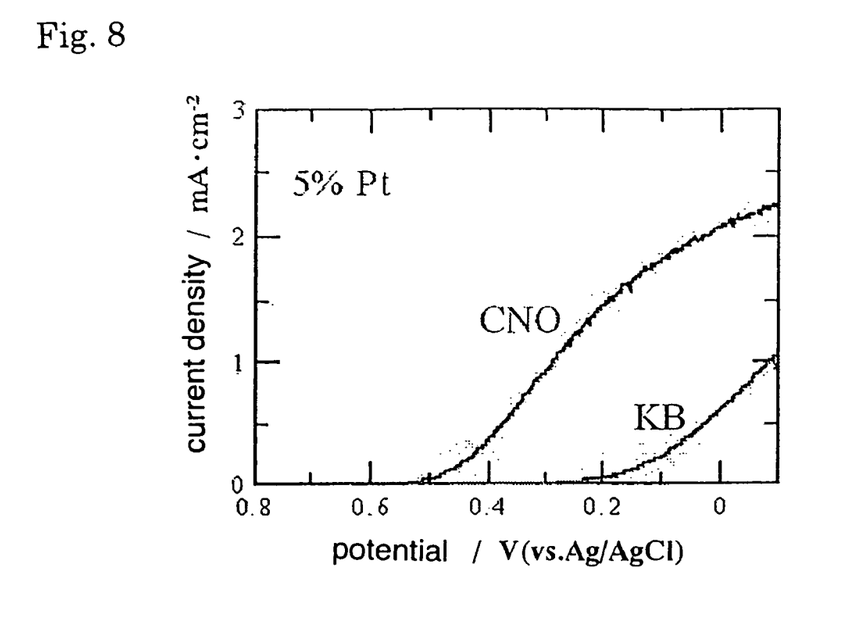
FIG. 8 shows the oxygen reduction voltammogram of an electrode catalyst for fuel cells according to the invention as comprising 5% by mass of platinum supported on a carbon nanoonion material (CNO) and that of a comparative electrode catalyst for fuel cells as comprising 5% by mass of platinum supported on Ketjen black EC (KB).

In FIGS. 6 to 8, there are shown the oxygen reduction voltammograms of the electrode catalysts for fuel cells according to the invention as comprising platinum supported on the carbon nanoonion material (indicated by "CNO" in the figures) and those of the comparative electrode catalysts for fuel cells as comprising platinum supported on Ketjen black EC (indicated by "KB" in the figures).

Comparisons were made on the same platinum dosage basis; namely, in the case of FIG. 6, the platinum dosage was 1% by mass, in the case of FIG. 7, the platinum dosage was 3% by mass and, in the case of FIG. 8, the platinum dosage was 5% by mass. Until the platinum dosage of 5% by mass, the electrode catalysts (CNO) for fuel cells according to the invention showed higher levels of activity as compared with the Ketjen black-based catalysts (KB).

FIGS. 6 to 8 indicate that the electrode catalysts (CNO) for fuel cells according to the invention are higher in catalytic activity than the Ketjen black-based catalysts (KB) and that an electrode catalyst CNO for fuel cells according to the invention, in which the platinum dosage is half that in a Ketjen black-based catalyst KB, is equivalent in activity to that Ketjen black-based catalyst KB.

Example 2

Now, an example is given in which a carbon nanoonion material (iron-carbon composite) was prepared using brown coal as the hardly graphitizable carbon-forming material.

Loy Yang coal (hereinafter abbreviated as "LY") produced in Australia was used as the raw material. Particles thereof were adjusted in size to 2 to 5.6 mm and stored in the air. This LY coal had a moisture content of 41.8% by mass and a brown coal component content of 58.2% by mass, and the elemental proportions in the brown coal components were as follows: C: 63.9% by mass, H: 4.8% by mass, N: 0.6% by mass, and O and other elements: 30.7% by mass.

$Fe(NO_3)_3 \cdot 9H_2O$, in an amount of 0.5 to 10% by mass on the iron atom basis, was caused to be supported, as an iron catalyst, on the above LY carbon. Carbonization was carried out by heating the sample to 1,000° C. at a heating rate of 150° C./min in a helium atmosphere and maintaining that temperature for 1 hour.

It was confirmed that the carbonaceous materials obtained in Example 2 each has the same carbon nanoonion structures as shown in FIGS. 1 to 3.

The carbonaceous materials obtained in Example 2 were evaluated for catalytic activity in the same manner as in Example 1. The electrode catalysts for fuel cells as obtained in Example 2 showed almost the same levels of catalytic activity as the electrode catalysts CNO for fuel cells as obtained in Example 1.

While, in Examples 1 and 2 given above, the hardly graphitizable carbon-forming material used was polyfurfuryl alcohol or brown coal, it is also possible to use, in addition to these, furan resins, thermosetting resins inclusive of phenol resins, cellulose, polyvinylidene chloride, lignin and so forth.

While, in Examples 1 and 2, iron was used as the metal compound-forming metal, it is also possible to use, in addition to iron as a metal compound-forming metal, cobalt, nickel, chromium, manganese and the like. The metal compound can have the form of a nitrate, chloride, acetate or acetylacetonato complex, or a metallocene or a derivative thereof.

It is also possible to admix a metallocene derivative containing at least one of iron, cobalt, nickel, chromium and manganese and having a copolymerizable functional group with a hardly graphitizable carbon-forming material, copolymerizing the both for blending, and carbonizing the resulting mixture by heat treatment to give a carbon material that contain catalytically induced turbostratic structures in parts of its structure.

An aspect of the invention is directed to an electrode catalyst for fuel cells which comprises a carbon material that contain catalytically induced turbostratic structures in parts of its structure and noble metal particles supported thereon; it produces marked effects in that since the noble metal particles are supported on the carbonaceous material having turbostratic structures in parts of its structure, the oxygen-reducing capacity manifested by the turbostratic structures activates the noble metal catalyst, with the result that the electrode catalyst can have a higher level of activity owing to the synergy between both the constituents and the noble metal catalyst usage can be reduced accordingly.

Another aspect of the invention is directed to an electrode catalyst for fuel cells which comprises a catalyst comprising a carbon material that contain catalytically induced turbostratic structures in parts of its structure and noble metal particles supported thereon and a catalyst comprising carbon black and noble metal particles supported thereon as mixed together; it produces marked effects in that since carbon black is capable of retaining water, the catalyst layer is improved in water drainage and in reactant gas diffusion as well and, furthermore, the solid polyelectrolyte and the solid polyelectrolyte membrane are wetted and, as a result, are improved in ionic conductivity, hence a catalyst layer higher in activity and durability can be provided.

Another aspect of the invention is directed to an electrode catalyst for fuel cells which comprises a carbon material that contain catalytically induced turbostratic structures in parts of its structure and noble metal particles supported thereon and carbon black as mixed together; it produces marked effects in that since carbon black is capable of retaining water, improvements are produced in water drainage and in reactant gas diffusion, so that the solid polyelectrolyte membrane is improved in wettability and ionic conductivity, hence a catalyst layer high in activity and water drainage can be provided.

Another aspect of the invention is concerned with an electrode catalyst for fuel cells, wherein the noble metal particles are selected from among platinum particles and other platinum group metal particles; it produces further marked effects in that the particles provide high levels of activity and are readily available, and high power generation characteristics can be obtained.

Another aspect of the invention is concerned with an electrode catalyst for fuel cells, wherein the turbostratic structures are created by admixing a metal compound with a hardly graphitizable carbon-forming material, followed by carbonization by heat treatment; it produces further marked effects in that a carbonaceous material having such turbostratic structures can be produced with ease and in that a carbonaceous material having the desired catalytic function (oxygen reducing ability) can be obtained by controlling the process of carbonization through selection of such conditions as the raw material species, reaction atmosphere, and treatment temperature.

Another aspect of the invention is concerned with an electrode catalyst, wherein the turbostratic structures comprise carbon nanoonion structures that have developed each in the form of an onion-like laminate around a metal particle; it produces a further marked effect in that a catalyst having better performance characteristics can be obtained.

Another aspect of the invention is concerned with an electrode catalyst for fuel cells, wherein the hardly graphitizable carbon-forming material is selected from the group of materials consisting of polyfurfuryl alcohol, furan resins, thermosetting resins, inclusive of phenol resins, brown coal, cellulose, polyvinylidene chloride and lignin; it produces a further marked effect in that it becomes possible to achieve reductions in cost.

Another aspect of the invention is concerned with an electrode material for fuel cells, wherein the metal compound contains at least one of iron, cobalt, nickel, chromium and manganese; it produces further marked effects in that these metals are readily available and inexpensive and, when a metal suited for the production conditions is selected from among them, those carbon nanoonion structures which have developed each in the form of an onion-like laminate around a particle of the metal species selected can be obtained with ease and, accordingly, a better catalyst high in activity can be obtained.

Another aspect of the invention is concerned with an electrode catalyst for fuel cells, wherein the level of addition of the metal compound to the hardly graphitizable carbon-forming material is within the range of 0.5 to 15% by mass based on the metal component contained in the metal compound; it produces further marked effects in that those carbon nanoonion structures can be obtained with ease, hence a better catalyst high in activity can be obtained and, furthermore, an electrode catalyst having a desired catalytic activity can be produced by varying the metal compound addition level within the above range.

Another aspect of the invention is concerned with an electrode catalyst for fuel cells, wherein the metal compound is in the form of a nitrate, chloride, acetate or acetylacetonato complex, or a metallocene or a derivative thereof; it produces further effects in that such metal compounds are readily available and a metal compound adapted to the production conditions and favorable from the cost viewpoint can be selected from among those metal compounds.

Another aspect of the invention is directed to a fuel cell in which the electrode catalyst for fuel cells produces a marked effect in that a high output, low cost cell module can be provided.

Another aspect of the invention provides a fuel cell in which one or both of the catalyst layers is/are formed from a mixture of the electrode catalyst for fuel cells according to any of Claims 1 to 3 and a solid polyelectrolyte; it produces marked effects in that by employing such catalyst layers with a structure having the solid polyelectrolyte network expanded in the direction of thickness of the catalyst layer as well, it becomes possible to markedly increase the number of three phase interfaces functioning as reaction sites and attain a higher level of electrode activity as compared with a fuel cell in which a catalyst layer is disposed merely on each side of the solid polyelectrolyte membrane.

Another aspect of the invention is concerned with a fuel cell, wherein a catalyst layer comprising a mixture of the electrode catalyst for fuel cells according to any of Claims 1 to 3 and a solid polyelectrolyte is applied to the cathode side; it produces further marked effects in that higher levels of oxygen reducing capacity can thus be manifested on the cathode side, resulting in an improvement in power generation performance.

Another aspect of the invention is directed to a membrane-electrode assembly which comprises a catalyst layer formed, in the form of a layer on at least one side of a solid polyelectrolyte membrane, from the electrode catalyst for fuel cells according to any of Claims 1 to 3 or a mixture thereof with a further added solid polyelectrolyte; it produces marked effects in that the composite is simple in constitution and easy to handle and can be used in the manufacture of a high output, low cost cell module.

Another aspect of the invention is directed to a gas diffusion electrode which comprises a catalyst layer formed, on a gas diffusion layer, from the electrode catalyst for fuel cells according to any of Claims 1 to 3 or a mixture thereof with a solid polyelectrolyte; it produces marked effects in that the gas diffusion electrode is simple in constitution and easy to handle and can be used in the manufacture of a high output, low cost cell module.

What is claimed is:

1. An electrode catalyst for fuel cells which comprises:
   a carbon material that contains catalytically induced turbostratic structures in parts of its structure and noble metal particles supported thereon,
   wherein the turbostratic structures comprise carbon nanoonion structures (onion-like carbon nanostructures) that have each developed in the form of an onion-like laminate around a metal particle comprising at least one of iron, cobalt, nickel, chromium and manganese.

2. An electrode catalyst for fuel cells which comprises a mixture of the catalyst set forth in claim 1 and a catalyst comprising carbon black and noble metal particles supported thereon.

3. An electrode catalyst for fuel cells which comprises a mixture of the catalyst set forth in claim 1 and carbon black.

4. An electrode catalyst for fuel cells according to any of claims 1 to 3, wherein the noble metal particles are selected from among platinum particles and other platinum group metal particles.

5. A fuel cell which comprises the electrode catalyst for fuel cells according to any of claims 1 to 3.

6. A fuel cell which comprises a catalyst layer or layers formed from a mixture of the electrode catalyst for fuel cells according to any of claims 1 to 3 and a solid polyelectrolyte.

7. A fuel cell according to claim 6, wherein a catalyst layer comprising a mixture of the electrode catalyst for fuel cells according to any of claims 1 to 3 and a solid polyelectrolyte is applied on the cathode side in the fuel cell.

8. A membrane-electrode assembly which comprises a catalyst layer formed, in the form of a layer on at least one side of a solid polyelectrolyte membrane, from the electrode catalyst for fuel cells according to any of claims 1 to 3 or a mixture thereof with a solid polyelectrolyte.

9. A gas diffusion electrode which comprises a catalyst layer formed, on a gas diffusion layer, from the electrode catalyst for fuel cells according to any of claims 1 to 3 or a mixture thereof with a solid polyelectrolyte.

10. An electrode catalyst for fuel cells according to any of claims 1 to 3, wherein the turbostratic structures are formed by admixing a metal compound which contains at least one of iron, cobalt, nickel, chromium and manganese, with a hardly graphitizable carbon forming material, followed by carbonization by heat treatment.

11. An electrode catalyst for fuel cells according to claim 10, wherein the hardly graphitizable carbon-forming material is selected from the group of consisting of polyfurfuryl alcohol, furan resins, thermosetting resins, inclusive of phenol resins, brown coal, cellulose, polyvinylidene chloride and lignin.

12. An electrode catalyst for fuel cells according to claim 10, wherein the level of addition of the metal compound to the hardly graphitizable carbon-forming material is within the range of 0.5 to 15% by mass based on the metal component contained in the metal compound.

13. An electrode catalyst for fuel cells according to claim 10, wherein the metal compound is in the form of a nitrate, chloride, acetate or acetylacetonato complex, or a metallocene or a derivative thereof.

* * * * *

UNITED STATES PATENT AND TRADEMARK OFFICE
CERTIFICATE OF CORRECTION

PATENT NO. : 7,585,585 B2  Page 1 of 1
APPLICATION NO. : 10/875506
DATED : September 8, 2009
INVENTOR(S) : Junichi Ozaki et al.

It is certified that error appears in the above-identified patent and that said Letters Patent is hereby corrected as shown below:

ON THE TITLE PAGE OF THE PATENT:

In Item "(75) Inventors:", after the name of the second inventor, "Asao Oya", delete "5-642-5, Hishi-cho, Kiryu-shi, Gunma (JP)" and insert --Kiryu (JP)--.

Signed and Sealed this

Twenty-third Day of March, 2010

David J. Kappos
*Director of the United States Patent and Trademark Office*